Feb. 24, 1970  J. R. LAW  3,497,283

COLOR SELECTION POLARIZING BEAM SPLITTER

Filed Aug. 24, 1966  2 Sheets-Sheet 1

JAMES R. LAW
INVENTOR.

BY Lowell J. Wise
ATTORNEY

Feb. 24, 1970 — J. R. LAW — 3,497,283
COLOR SELECTION POLARIZING BEAM SPLITTER
Filed Aug. 24, 1966 — 2 Sheets-Sheet 2

INVENTOR.
JAMES R. LAW
BY
ATTORNEY

United States Patent Office 3,497,283
Patented Feb. 24, 1970

3,497,283
COLOR SELECTION POLARIZING
BEAM SPLITTER
James R. Law, Chili, N.Y., assignor to Bausch & Lomb
Incorporated, Rochester, N.Y., a corporation of New
York
Filed Aug. 24, 1966, Ser. No. 574,663
Int. Cl. G02b 5/30, 27/28; H04n 5/26
U.S. Cl. 350—148                                           7 Claims

ABSTRACT OF THE DISCLOSURE

An optical system is disclosed which is useful for separating a beam of white light into red, blue and green components. This is accomplished by impinging a beam of white light on a polarization plate which is located at a 45° angle to the beam. A portion of the beam is transmitted and a portion reflected by the plate. An interference filter and a quarter wave polarization reversal plate are located at each of three different quadrature positions around the polarization plate. The filters pass only a single waveband while reflecting all others and the reversal plates alter the polarization of the reflected wavebands. Upon successive reflections each waveband is passed through its appropriate filter with only slight attenuation of the incident beam.

---

This invention relates to an optical device and process for diverging a complex electromagnetic spectrum, such as white light, into three narrow spectral components, such as red, green and blue light. Conversely, this invention provides methods and apparatus for mixing up to three bands of radiation having various intensities into a blended output spectrum.

Beam splitting of complex chromatic radiation into several components has become a matter of concern to the optics industry. Color television cameras employ optical systems for transferring light between an object plane and three image planes correlated to different color components in the white light reflected from the object being recorded for viedo transmission. A typical system for color television, such as disclosed by Sachtleben et al. in U.S. Patent 2,672,072, achieves the necessary color separation by disposing two dichroic mirrors diagonally in the path of the white light. Both mirrors transmit a green band while reflecting red or blue, and images related to each color intensity are transmitted. Such systems frequently require optical corrections for astigmatism, etc., largely due to the asymmetric arrangement of the dichroic mirrors.

A second use for the present invention is in the combination of several components to form a complex spectrum of the radiation. This is essentially opposite to the above process, but the same apparatus may be used for beam splitting or mixing. The input intensities of the individual components may be controlled to produce the desired blend of constituent radiation in the output. This can be of use, for example, in color comparison instruments, chromatic analyzers, color image reconstruction.

A new structure has been discovered which can be used in several optical instruments and performs well in radiation dividing or converging methods. Features of the novel device include a polarizing means for transmitting a portion of radiation striking the polarizer at an oblique angle while reflecting a second portion of the radiation. A thin layer of birefringent material such as mica is satisfactory for the polarizing means. A second feature is a polarization reversal means for altering the polar orientation of radiation traveling from the polarizer and returning by reflection, so that radiation which is initially transmitted by the polarizing layer is reflected after reversal. The other essential elements of the structure include three different interference filters having optical properties which permit each one of the interference filters to transmit a different one of three spectral bands while reflecting the other two bands.

The description of the invention will be applied primarily to the dividing of white light into bands of red, green and blue light; however, other electromagnetic spectra can be manipulated using equivalent apparatus. Also, the main embodiments will describe beam spitting processes; but the converse processes for radiation mixing will be inherent in most apparatus. Where images are to be translated into component colors a higher order of dimensional and angular control must be present. Usually a collimated beam of white light is directed along the principal axis of the system with the resulting red, green and blue collimated beams containing the image information being directed in the output directions along the principal axis and a perpendicular second axis.

The invention can be constructed from standard optical parts presently available. In the preferred embodiment a thin polarizing layer of birefringent material is held between two diagonal sections of an isotropic transparent block with complex light entering one face of the block to intersect the polarizer at an oblique angle of about 45°. Initially the input light is split with regard only to polarization orientation, with achromatic rays of one orientation being transmitted and rays of the opposite orientation being reflected by the polarizer. After polarization the achromatic rays travel toward selective interference filters where one of the components is transmitted and the others are reflected toward the polarizer. During this process rays reflected by the interference filters pass twice through a quarter-wave retardation plate so that the polarization orientation is reversed. When approaching the polarizer the second time, the rays have assumed an orientation which will permit previously-transmitted rays to be reflected by the polarizer, and vice versa. In theory, a ray may reach the polarizer one to three times according to its color and polar character.

There are numerous advantages to the present invention. Its compactness and ease of assembly are significant in many systems. The distribution ratio of polarization among the separated components is identical to that of the same component in the complex spectrum. Either polarizer or unpolarized light may be used. The radiation transfer efficiency of the process is very high and systems employing this invention can operate under wide ambient conditions. Relatively simple image conditioning lenses can be utilized. The position of each interference filter may be interchanged with the others with a corresponding change in spectral component output direction.

Accordingly, it is an object of this invention to provide novel methods and apparatus for converging or diverging complex radiation and its component spectral bands. It is a further object to realize these results by means of a selective polarizer and multiple interference filters transmitting different spectral bands corresponding to the desired components with polarization reversal means located between the polarizer and the various filters. These and other objects and features of the invention will be seen in the description and in the drawing in which.

Figure 1:
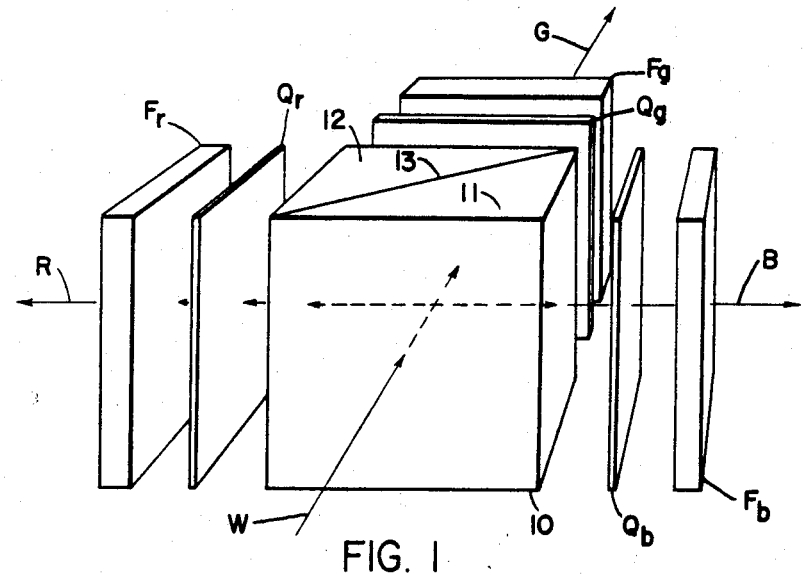
FIG. 1 is a perspective view of the optical apparatus showing three-component beam splitting.

The three-dimensional perspective view of FIG. 1 shows an optical system 10 having diagonal cube sections 11 and 12 with a polarizing layer 13 held between diagonal faces of the cube sections.

Figure 2:
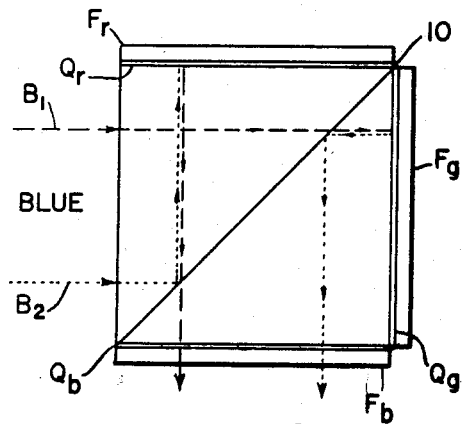
FIGS. 2-4 are schematic representations of the optical phenomena showing typical polar ray traces of blue, green and red light components.
Figure 3:
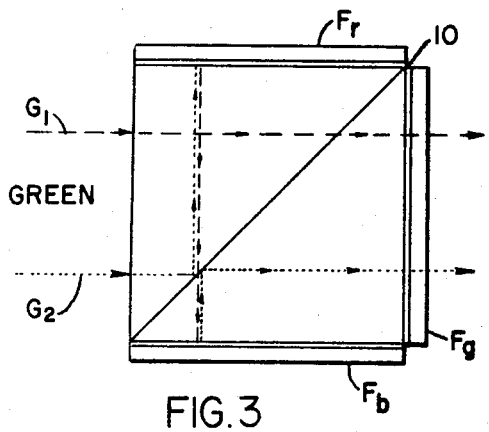
Figure 4:
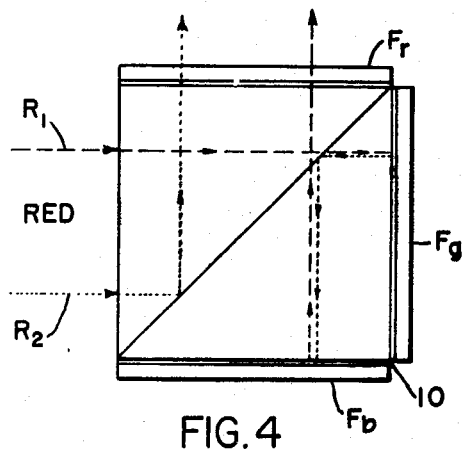

Adjacent to the side and rear faces of the cube are three retardation plates $Q_r$, $Q_g$ and $Q_b$ corresponding to three interference filters $F_r$, $F_g$ and $F_b$, which transmit red, green and blue spectral bands, respectively. A beam of broad-spectrum white light W is directed toward the beam splitter 10 and separated into three component beams R, G and B, which are red, green and blue respectively. In order to properly understand the nature of the invention, typical ray traces for different polarization orientations of each of the three color components are shown in FIGS. 2–4, where entering rays of first and second polar values of blue, $B_1$, $B_2$; green, $G_1$, $G_2$; and red, $R_1$, $R_2$; are traced through their paths. The ray traces are shown in a manner such that the polarization orientation of each segment of the ray is identifiable. The portions which may be transmitted by the polarizing plate 13 are shown by dashed lines and those portions oriented such as to be reflected are denoted by dotted lines. The beam splitter of FIGS. 2–4 is substantially the same as FIG. 1, except that the cube, retardation plates and filters are in optical contact rather than being separated.

In FIG. 2 a blue ray $B_1$ of such orientation as to be transmitted by polarized 13 and reflection-oriented blue ray $B_2$ enter the system 10. $B_1$ is transmitted through the polarizer 13 toward green filter $F_g$ where it is reflected back to the polarizer. While passing twice through the quarter-wave retardation plate $Q_g$, the polarization of $B_1$ is reversed so that the polarizer 13 now reflects this ray toward blue filter $F_b$ which passes the blue component. The oppositely oriented ray $B_2$ is reflected initially by the polarizer 13 toward red filter $F_r$, where it is reflected and its polarization reversed by plate $Q_r$. Ray $B_2$ is now transmission-oriented and passes through polarizer 13 and blue filter $F_b$ along with ray $B_1$. Note that the polarization of $B_1$ and $B_2$ have reversed, but the distribution ratio remains the same. However, as can be seen in FIGS. 3 and 4, such a reversal of polar orientations does not take place for either the green or red images. In both of these figures, one of the polar orientations is transmitted through its output filter without an orientation reversal, while the other orientation, in each case, undergoes a double reversal to return to its former orientation before exiting from the system. Also, in comparing the image patterns of the collimated beams shown in FIGS. 2–4, it can be seen that the blue and green output images are the same as the input images, while the red output image has undergone a side-to-side reversal. Therefore, depending upon the usage of the outputs, the polarization of the blue output may be reversed and the red image may undergo an additional side-to-side reversal by means of additional equipment not shown herein. It should be noted that the direction of the typical rays may be reversed for the case where the apparatus is used for mixing the plurality of inputs.

Also, it should be noted that if the polarization plate 13 were to be located across the opposite diagonal of the cube, that the relationships just described for the blue and red outputs would be reversed. Furthermore, it is possible to have the different color filters on any of the three faces of the cube 10. The relationship shown is merely exemplary.

Figure 5:
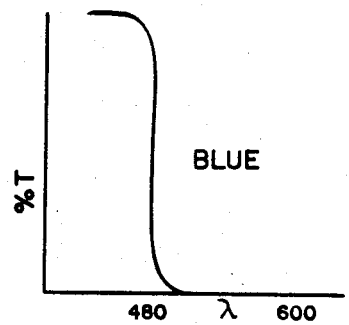
FIGS. 5-7 show plots of transmittance vs. wavelength for typical blue, green and red interference filters.
Figure 6:
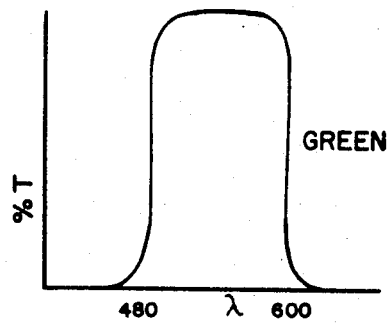
Figure 7:
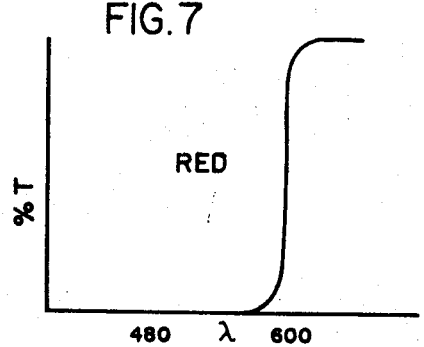

Typical optical properties for the interference filters are shown in FIGS. 5–7 corresponding to blue, green and red filters $F_b$, $F_g$ and $F_r$. These spectral bands also correspond to the light components represented in adjacent FIGS. 2–4. These are plots of percent transmittance (T) in relation to wavelength ($\lambda$). Since there is little absorption in the preferred filters, percent reflectance may be assumed to be $100-T$. It is desirable to select filters having sharp changes in transmittance at the upper and lower predetermined wavelengths in order to minimize absorption by the system and to achieve sharp band definition.

Figure 8:
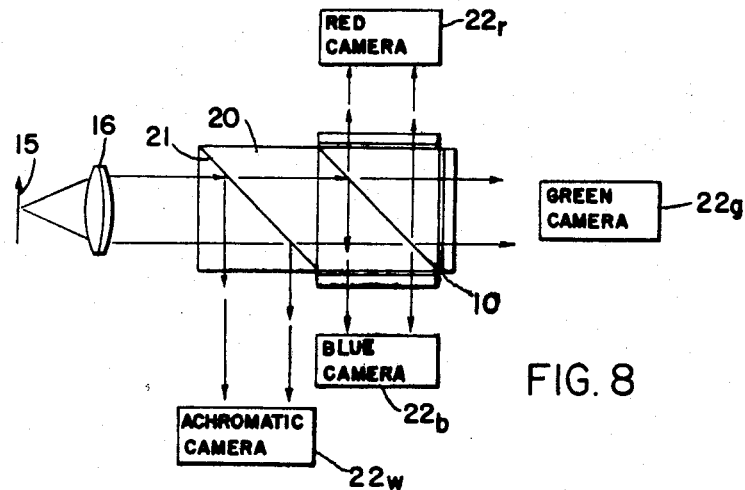
FIG. 8 is a schematic showing of a color video camera using this invention.

The incorporation of the invention into a video signalling camera is shown in FIG. 8, where achromatic rays from an object 15 are collimated by an objective lens system 16. Optionaly, a portion of the achromatic image pattern is diverted by an ordinary beam splitter 20 which could include a diagonal achromatic partial mirror 21. The reflected achromatic light is converted to a video signal by camera 22w and the transmitted achromatic light is split into the three colored components in the manner of this invention by beam splitter 10. The image patterns in red, green and blue are directed toward cameras 22r, 22g and 22b.

Figure 9:
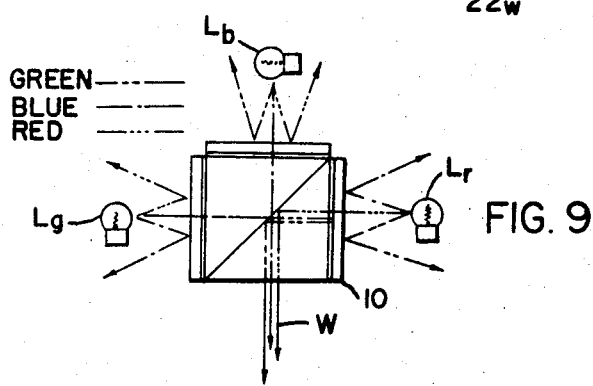
FIG. 9 is a schematic showing of a color-mixing system for obtaining a complex spectrum from three components. Like numbers refer to like parts throughout the drawing.

The use of the invention in mixing up to three components of radiation is shown in FIG. 9. Light sources, Lg, Lb and Lr, containing the preselected band of green, blue and red light are placed to expose the three input faces of the integrator block 10. If the light sources are ordinary incandescent lamps, the white light incident upon the outside surface of the interference filters is subject to the same dichroic reflection as that light from the inside. Therefore, only a selected band from each source of radiation is mixed to constitute output beam W. The intensity of each component is easily regulated by controlling the power of the lamps. In this manner a complex light source can be generated.

EXAMPLE

The beam splitter block was constructed from a 10 cm. bisectional cube of optical-grade glass having a quarter-wave thickness of birefringent mica between the diagonal faces of the cube sections perpendicular to the top and bottom of the cube. This provided a planar layer of very thin polarizing material disposed at a 45° oblique angle to the two optical axes of the system. For most devices using the principles of this invention, the polarizer should be at an angle of 42° to 48° of each optical axis. The four sides of the block should be optically ground and polished to assure quality performance.

The interference filters are multi-layer devices designed for operation in an air ambient with an optical crown glass substrate ($n=1.52$). In the customary manner the laminate sequence of dielectric materials is designated in quarter-wave thicknesses and fractions. The quarter-wave refers to a reference wavelength taken at a value near the portion of the spectrum being transmitted and reflected. For visible light the reference wavelength $\lambda_r$ is taken at about 550 millimicrons. The blue filter is described by the notation: GLHLHLHLHLHLH(.5L)A;

where:

G=glass substrate,
H=$\lambda$/4 layer thickness of material such as ZnS having a relatively high index of refraction,
L=$\lambda$/4 layer of low index material such as MgF$_2$, and
A=ambient (air).

In this filter the reference wavelength $\lambda_r$ was taken at 575 millimicrons. The alternating-layer filter structure noted above has a transmittance-wavelength curve as shown in FIG. 5 with a sharp decrease in transmitted waves above 480 millimicrons.

The green filter is another multi-layer thin film structure with the notation: GHLLHLHLHHLHLHLLHA, where the reference wavelength is taken at 520 millimicrons. The selective transmission band is shown in FIG. 6.

The red filter has the notation:

G(.5H)LHLHLHLHLHL(.5H)A where the reference wavelength is taken at 494 millimicrons. There is a sharp increase in transmittance above 600 millimicrons, as shown in FIG. 7. The above film combinations are presented as examples only, and additional layers may be added to widen the reflectance band or increase the transmission in a number of ways known to those versed in the coating of thin films. These filters are ordinarily produced by vacuum deposition of the evaporated high and low index materials. It is not necessary to have air at the outer face of the filter, although this is preferred.

Other selective filters, such as the Fabry-Perot type, may be used in this invention.

A quartz quarter-wave retardation plate was mounted between the parallel faces of the glass cube and each of the filters to provide polarization reversal for filter-reflected rays. This reversal may be achieved by any convenient method, such as shown by Flood in U.S. Patent 2,449,287. Standard laboratory optical elements were employed in this example, and a beam of white light incident upon the front face of the cube was divided into a brilliant red band passed through the red filter at the rear face of the cube, and equally-bright green and blue bands passed through the respective filters on the side faces.

Where a unitary structure is desired, the phase-reversal plates and filters may be cemented onto the block or these elements can be coated individually on the substrate as by evaporation in a vacuum. Also, a polarizing film of the multi-layer type described by MacNeille in U.S. Patent 2,403,731 may be used.

While there has been shown and described what is considered to be a preferred embodiment of the present invention, it will be obvious to those skilled in the art that various changes and modifications may be made therein without departing from the invention.

What is claimed is:

1. An optical system for dividing an electromagnetic radiation spectrum from a radiation source into three spectral bands, the spectrum band including a first band of radiation having wavelengths below a first predetermined length, a second band of radiation having wavelengths above a second longer predetermined length, and a third band of radiation having wavelengths between the first and second predetermined lengths, the optical system comprising:

selective polarization means for transmitting radiation of a first polarization orientation and reflecting radiation of a second orthogonal polarization orientation, the polarization means being disposed transverse to rays from the radiation source, the transmitted rays defining a first optical axis and the reflected rays defining a second, transverse optical axis;

three interference filters being positioned to receive radiation from the selective polarization means, one of the filters being positioned essentially orthogonal to the first optical axis after the selective polarization means, the second and third filters being positioned essentially orthogonal to the second optical axis on opposite sides of the selective polarization means, each of the filters transmitting a separate one of the bands of radiation in the spectrum band while reflecting the other two bands of radiation toward the selective polarization means; and individual polarization reversal means disposed transverse to the respective optical axis, between the selective polarization means and the interference filters for reversing the polarization orientation of the radiation reflected by the interference filters toward the selective polarization means.

2. The optical system of claim 1 in which the polarization reversal means includes a quarter-wave retardation plate.

3. The optical system of claim 1 in which the selective polarization means includes a thin layer of polarization material disposed in a plane rotated aproximately 45 degrees from the first optical axis.

4. An optical system according to claim 1 in which the selective polarization means comprises a polarizing layer held diagonally in a transparent bisectional block, the block having a front face for receiving the electromagnetic radiation and a rear face which are disposed approximately perpendicular to the first optical axis and a pair of side faces which are disposed approximately perpendicular to the second optical axis, the quarter-wave retardation plates and the interference filters being disposed parallel to the rear and side faces of the block.

5. The optical system of claim 4 in which the retardation plates contact the block and respective interference filters.

6. The optical system of claim 1 in which multi-colored image rays to be telecast comprise the radiation source and in which video signal producing means receive each of the three component spectral bands.

7. The optical system of claim 6 including an achromatic beam splitter between the radiation source and the selective polarization means.

References Cited

UNITED STATES PATENTS

| | | | |
|---|---|---|---|
| 2,865,245 | 12/1958 | Kelly | 350—171 X |
| 2,958,258 | 11/1960 | Kelly | 350—152 X |
| 3,202,039 | 8/1965 | DeLang et al. | 350—166 X |
| 3,303,278 | 2/1967 | Beno et al. | 350—171 X |
| 3,333,053 | 7/1967 | Back | 350—169 X |

DAVID SCHONBERG, Primary Examiner

PAUL R. MILLER, Assistant Examiner

U.S. Cl. X.R.

178—5.4; 350—152, 157, 166, 169, 173